Nov. 6, 1945.  W. W. WEETH ET AL  2,388,454
HARVESTER
Filed Oct. 9, 1943  2 Sheets-Sheet 2
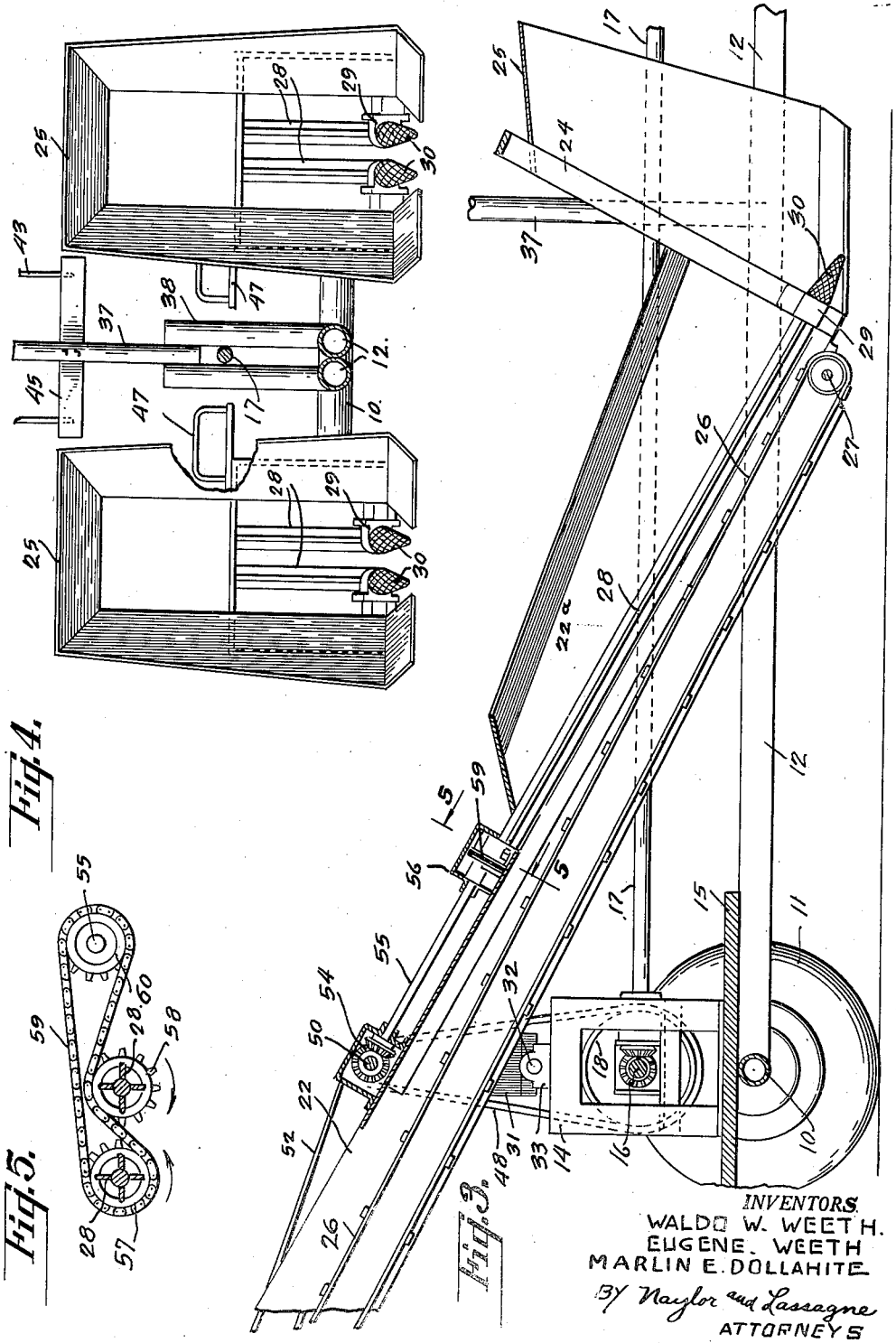
INVENTORS.
WALDO W. WEETH.
EUGENE. WEETH
MARLIN E. DOLLAHITE.
BY Naylor and Lassagne
ATTORNEYS Patented Nov. 6, 1945

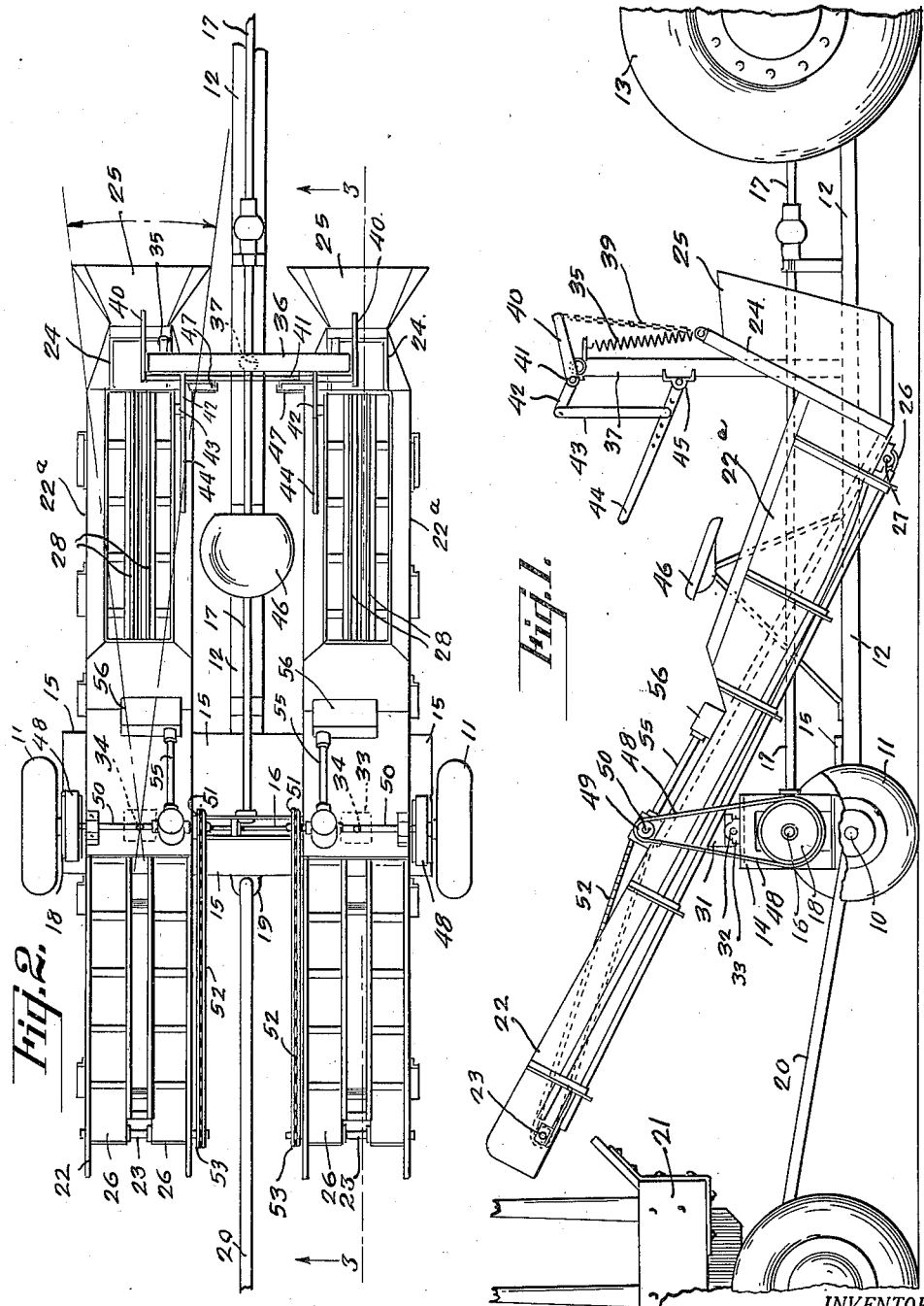

2,388,454

UNITED STATES PATENT OFFICE 2,388,454

HARVESTER

Waldo W. Weeth and Eugene Weeth, Coalinga, Calif., and Marlin E. Dollahite, Johnson City, Tex.; said Dollahite assignor to said Waldo W. Weeth and Eugene Weeth Application October 9, 1943, Serial No. 505,630

3 Claims. (Cl. 56—33)

The present invention relates to machines for harvesting row grown crops and is more particularly directed to improvement of multiple row machines for stripping and gathering cotton bolls or the like in the field.

Harvesters of this type are designed to straddle the rows of standing plants and strip the bolls therefrom as the machine moves along the plant rows. To do this efficiently it is essential that the stripping units be maintained in proper relation to the plant rows during operation and it is the main object of the present invention to provide a construction which will permit a two-row stripper to have each of its gathering units separately movable for guiding, so that deviations in the plant rows, variations in ground level, and lateral shift of the tractor drawing the stripper can all readily be met through proper adjustments made by an operator on the harvester and the stripping units kept in proper relation to the rows at all times. Other objects are to provide power driven stripping units mounted in supplemental frames carried on universal joints intermediate the ends thereof and controlled by an operator stationed near the front or row engaging ends of the units and to provide plant engaging means at the front end of the frames which will assist in maintaining proper relation with the plant rows. Further advantages arising from the simplified and improved features of construction embodied in the machine will become evident in the more specific description of the structure which follows and which is illustrated in the accompanying drawings where, Figure 1 is a side view of a stripper embodying the novel structure, showing its relation to the propelling tractor and to the trailing vehicle for receiving the gathered crop.

Figure 2 is a plan view of the machine.

Figure 3 is a sectional view taken along the line 3—3 of Figure 2.

Figure 4 is a front end view of the stripper units, and

Figure 5 is a detailed sectional view of part of the driving means taken on line 5—5 of Figure 3.

The machine illustrated has a wheeled supporting frame consisting in the construction shown of a rear axle 10 supported on wheels 11. The axle 10 is centrally fixed to a forwardly extending main frame member or tongue 12 which may be composed of twin tubular members or bars as seen in Figure 4 and which projects a suitable distance at the front of the machine for coupling to the draw-bar of a tractor, partly shown at 13, Figure 1. At each side of its connection to the central tongue the axle 10 carries a supporting stand 14. These stands are secured to a transverse platform member 15 mounted on the axle 10 and frame member 12. The stands 14 serve as supports for the bearings of a transverse drive shaft 16 located directly above and parallel to the axle 10 and substantially midway between the axle and the upper surface of the stands. The drive shaft 16 is driven by a propeller shaft 17 located centrally of the supporting frame and directly above the tongue member 12 on which its bearings are supported at suitable points. This propeller shaft extends forwardly a suitable distance for coupling to the power take-off of a tractor. A belt pulley 18 is keyed to each end of drive shaft 16 at the outer sides of stands 14. A suitable clevis 19 (Figure 2) is provided at the central rear part of axle 10 for connection to a draft link 20 on a trailing receiving vehicle 21 partly shown in Figure 1.

Each of the stands 14 serves as the main support for one of the laterally disposed supplemental or stripper frames containing the harvesting units and as the two supplemental frames and units are identical and symmetrically located at each side of the central frame member 12, description of one of them, as follows, will suffice. Each stripper unit constitutes an elongated trough like frame extending at an inclination upwardly and rearwardly from adjacent the ground level at its forward end to wagon box height at its rear end where it extends well beyond the axle of the supporting frame as shown. Each unit comprises side walls 22 suitably spaced apart and connected at the rear by a rotatably mounted spacer shaft 23 (Figure 2). The forward portions of the side walls at 22a, are preferably increased in height and inclined inwardly as shown, to better confine the material being acted on by the snap rolls. The forward ends of the side walls are secured to an upwardly arched yoke member 24 which also carries the flared plant receiving hood 25 shaped to receive and center the standing plants. The lateral halves of each unit carry endless belt conveyers 26 which are trained over the shaft 23 at the rear and over a pair of spaced idler shafts 27 at the front. Substantially the forward halves of these conveyers are in cooperating relation to the respective units of a pair of snapping rolls or bars 28 located above the inner edges of the conveyers. These rolls are suitably spaced to receive the plants and may be of any desired construction and yieldably mounted in bearings 29 at the front as is usual in this type of harvesting mechanism. Knurled cone shaped heads 30 are provided on the ground ends of the rolls for initial engagement of the plants. A preferred form of snap roll having four radial flanges 28 is shown.

The main support for each stripper frame is on a stand 14 and comprises a bracket member 31 fixed to the stripper frame and with its base spaced a little above the top of stand 14 and pivoted at 32 on a transverse pivot carried in upstanding ears forming part of a swivel plate 33 vertically pivoted at 34 (Figure 2) to the stand 14. This connection allows lateral movements of the stripper frame in the manner indicated by the double arrow in Figure 2 and vertical movement is likewise allowed on pivot 32. To provide for such free movement of each unit, the front end thereof is resiliently suspended on a coil spring 35 depending from the cross piece 36 of a central vertical post 37 (Figure 4) the forked lower end 38 of which is welded or otherwise fixed to the members of tongue 12. Also connected to the unit is a flexible member or chain 39, the upper end of which is attached to a forward arm 40 of a crankshaft 41 pivoted on cross piece 36 which has a rear arm 42 pivotally connected by a link 43 with a free lever 44 extending rearward from standard 37 and pivoted on the end of a cross bar 45 secured to the mid-portion of the standard. This arrangement places the handle end of lever 44 (one on each side) in convenient proximity to a seat 46 mounted on tongue 12 adjacent the forward ends of the stripper frames. A stirrup 47 (Figure 4) is fixed to each frame below lever 44. Thus, an operator stationed on seat 46 can use his feet in stirrups 47 to effect lateral movements of the frames as well as to depress them against tension of springs 35 and with his hands on levers 44 can raise the frames individually as required to keep them in proper relation to the plant rows. The operator's position near the forward or engaging portions of the frames enables him to view the approaching rows of plants as they pass under the tractor axle and to accurately compensate for any changes in ground level or lateral shift.

Transmission of driving power to the elevators and snapping rolls of each frame is preferably effected through a drive belt 48 connecting the pulley 18 with a smaller pulley 49 on the outer end of a connecter-shaft 50 mounted on the frame. The inner end of shaft 50 carries a sprocket 51 connected by a drive chain 52 with a sprocket 53 on shaft 23 which drives the twin conveyers 26. Between its ends, connecter shaft 50 has a bevel gear connection at 54 (Figure 3) with a forwardly extending drive shaft 55 which enters a gear housing 56 adjacent the rear or upper ends of the snap rolls 28. These ends carry sprockets 57, 58 (Figure 5) which are geared through chain 59 to a sprocket 60 on shaft 55 thus rotating the rolls as indicated by arrows in Figure 5 and causing the stripped cotton bolls to be projected upwardly and outwardly onto the conveyers 26 on which they are carried back to the receiving trailer. As the frame pivots 32 and 34 and drive shafts 16 and 50 lie in the same vertical transverse plane, the belt drive utilized as the main driving element affords ample flexibility for the small range of movement necessary on the pivots 32 and 34 as the forward ends of the frames are shifted and is both desirable and economical.

The structure herein described discloses the essential features of a two row harvesting machine embodying the features of simplicity of construction, facility of guiding and advantageous location of operator's station characterizing the invention, but it will be obvious that various structural changes are possible within the scope of what is claimed without departure therefrom.

We claim:

1. A row crop harvester comprising a supporting frame with a wheel supported axle and a central forwardly extending member constituting a draft tongue, inclined forwardly, extending supplemental frames mounted above the axle at each side of the central member on pivots affording both vertical and lateral movement, an upright standard on the forward portion of the central member, resilient suspension means between the forward ends of the supplemental frames and the upper portion of the standard, and freely movable control levers pivoted on each side of the standard and flexibly connected to the forward ends of the supplemental frames for shifting them, the free ends of the levers extending adjacent the operator's station.

2. A row crop harvester comprising a supporting frame with a wheel supported axle at the rear and a central forwardly extending member constituting a draft tongue and adapted to be connected to a tractor, inclined longitudinally extending supplemental frames mounted above the axle at each side of the central member at points substantially midway the length of said frames on pivots affording both vertical and lateral movement, the rear portions of said supplemental frames extending beyond and above the axle to cooperate with a crop receiving trailer, power driven crop harvesting and conveying means mounted in said supplemental frames, plant gathering means on the forward ends of said frames, freely movable connections between said ends and the central member of the supporting frame, an operator's station on the supporting frame adjacent said ends, and means connected to the supplemental frames and operable from said station for shifting said frames about the pivots.

3. A row crop harvester comprising a wheeled supporting frame, an inclined supplemental frame carried on the supporting frame and pivoted thereon for vertical and horizontal movement, power driven stripping and conveying mechanism mounted in the supplemental frame, means on the forward portion of the supplemental frame for shifting the same on its pivotal connection to the supporting frame, a transverse drive shaft on the supporting frame, a driven shaft on the supplemental frame connected to the stripping and conveying mechanism, said shafts and the pivots of the supplemental frame being located in the same transverse vertical plane, and a flexible driving connection between the driving and driven shafts.

WALDO W. WEETH.
EUGENE WEETH.
MARLIN E. DOLLAHITE.